ARTHUR E. MEIXNER
FREDERICK W. REYNOLDS
INVENTORS

ATTORNEYS

CONST. $I = 6.3 \times 10^7$ AMPS.

FIG. 10a

ARTHUR E. MEIXNER
FREDERICK W. REYNOLDS
*INVENTORS*

BY

ATTORNEYS

United States Patent Office 3,453,143
Patented July 1, 1969

3,453,143
METHOD OF MAKING A MOISTURE SENSITIVE CAPACITOR
Arthur E. Meixner, Saddle Brook, and Frederick W. Reynolds, Ridgewood, N.J., assignors to Singer-General Precision, Inc., a corporation of Delaware
Original application Oct. 28, 1964, Ser. No. 406,987. Divided and this application Oct. 13, 1965, Ser. No. 515,269
Int. Cl. H01b 1/10; B32b 17/06
U.S. Cl. 117—217                              2 Claims

ABSTRACT OF THE DISCLOSURE

Method of making a thin film capacitor which is extremely sensitive to moisture and humidity. The capacitor includes a glass substrate, a first thin film gold electrode plate, a homogeneous silicon dioxide dielectric thin film over the first gold plate, a second gold thin film plate partly over the silicon dioxide dielectric thin plate and over the substrate.

---

This application is a division of application Ser. No. 406,987, filed Oct. 28, 1964 and now abandoned.

The present invention relates to the manufacture of a moisture responsive electrical device and more particularly to such a device which can provide a fast response and can be used in electrical circuitry such as a regulator or control arrangement.

Small effects of humidity upon the electrical properties of thin film capacitors have been previously observed. However, the electrical effect was small and a considerable change in ambient moisture was required to produce any appreciable change in capacitance. For this reason, such capacitors have not been used to any great extent for this purpose. Although attempts may have been made to provide moisture responsive capacitors, none, as far as we are aware, have ever been used successfully in a practical system.

It has now been discovered that a very fast response time, moisture controlled, in thin film variable impedance may be made from fast evaporated quartz film. The order of magnitude of the response is sufficient for the device to be used in a system and the response time is in the range of seconds.

In the production of thin films, the thin film basic material:gas ratio during evaporation plays a very important part in determining the evaporated film characteristics. In general, the greater this ratio, the closer the approach to many of the bulk properties. The material:gas ratio for present methods of evaporation are severely limited, rarely exceeding 100:1. Most evaporated films are highly contaminated by the ambient residual gas during evaporation. It is common for such contamination to attain values of several percent.

Another object of the present invention is to provide an evaporation method in which the thickness of the deposited film is uniquely determined by the total energy supplied (joules). This offers a simple and reliable method for control of film thickness, particularly in the manufacture of capacitors.

A further object of the present invention is to provide a method which yields essentially complete evaporation of all the material acted upon by the energy source. This is important when evaporating alloys. The components of an alloy, in general, have different vapor pressure temperature values and hence tend to fractionate during evaporation. The composition of the film, therefore, usually differs from that of the source material.

Another object of the present invention is to greatly reduce the total amount of radiant energy received by the film during evaporation from the evaporating source since heating of the film in this manner alters the film characteristics.

Yet, another object of the present invention is to provide a thin film capacitor extremely sensitive to moisture.

Other objects and advantages of the present invention will be apparent from the following detailed description thereof when taken in conjunction with the accompanying drawing, in which:

FIG. 10a explains schematically the equivalent circuit used for the measurements described in Example I; and,
FIG. 10b shows a plot of the response performance as a function of time at a constant frequency determined by calculating the change in impedance from measurements taken at different time intervals on the bridge illustrated schematically in FIG. 10a.

Generally speaking, the present invention contemplates a thin film capacitor which is extremely sensitive to moisture and humidity. This capacitor generally includes a glass substrate, a first thin film gold electrode plate over the substrate, a homogeneous silicon dioxide dielectric thin film over the first thin film gold electrode plate, and a second thin film gold electrode plate partly over said silicon dioxide dielectric thin film and over said substrate. The thin film silicon dioxide dielectric material is deposited over the gold electrode by means of an electrostatically focussed electron gun. This type of gun is particularly suitable for evaporation of thin films where the presence of stray inhomogeneous matter cannot be tolerated. Another feature of this particular gun is that it has been designed for operation as space charge current limited. This means that the current has a known and fixed value for a given geometry and voltage provided that the cathode emission is equal or greater than that required to supply the designated current. With this type of operation the beam power is a known function of time. Consequently, the same evaporation conditions can be accurately repeated.

Figure 1:
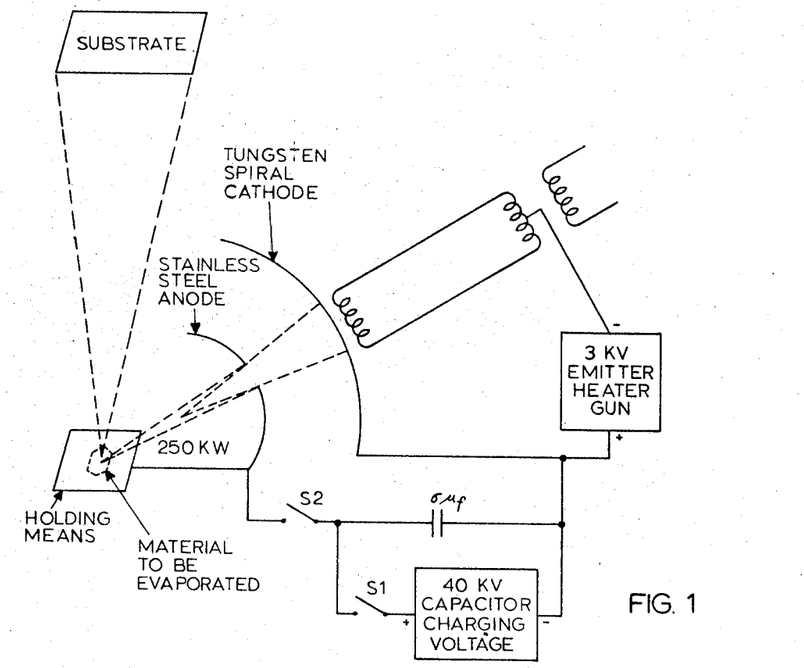
FIG. 1 is a schematic explanation of the electrostatically focussed electron gun used herein.

In the electron gun shown in the drawing, cathode and anode are sections of concentric spheres having a radii ratio of 2.0. The emitter is of the button-type indirectly heated by another electron gun of simple structure. The peak power of the main beam is of the order of 250 kw. A somewhat similar gun, but only 1/200 this peak power, has been described by R. Thun and J. B. Ramsey. (Vacuum Symposium Transactions, American Vacuum Society, 1959, page 192.)

If a total pulse energy of at least 2000 joules is needed for the evaporation of the material selected, 40 kv. can be selected as the charging voltage, 6 μf. as the capacity, and 6 amps as the maximum beam current.

Since the gun has been designed to operate space charge current limited, the current I at any time $t$ after start of the pulse is given by:

$I = K(V)^{3/2}$ where V is voltage across condenser at time $t$.

For the gun constants described later, $$K = 7.6 \times 10^{-7}$$

The expression for voltage remaining on the capacitor versus elapsed time $t$ in seconds is given by:

$$t = \frac{2C}{K}\left[\left(\frac{1}{V}\right)^{1/2} - \left(\frac{1}{V_0}\right)^{1/2}\right]$$

The corresponding equation for beam current is:

$$t = \frac{2C}{K^{2/3}}\left[\left(\frac{1}{I}\right)^{1/3} - \left(\frac{1}{I_0}\right)^{1/3}\right]$$

For:
$C = 6$ μf.
$2C/K = 15.8$
$2C/K^{2/3} = .145$

Figure 2:
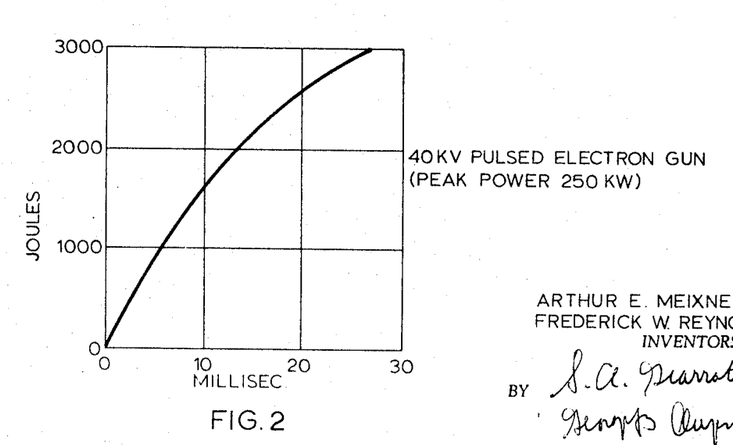
FIG. 2 shows a plot of the total beam energy as a function of time for the gun depicted in FIG. 1.

Using the foregoing equations, a plot of total beam energy versus time for the gun of FIG. 1 is shown in FIG. 2. This curve pertains to the 40 kv. gun operated by discharge of the 6 μf. condenser which has been charged to this voltage. About 2000 joules of energy is applied by the beam in 15 milliseconds.

Figure 3:
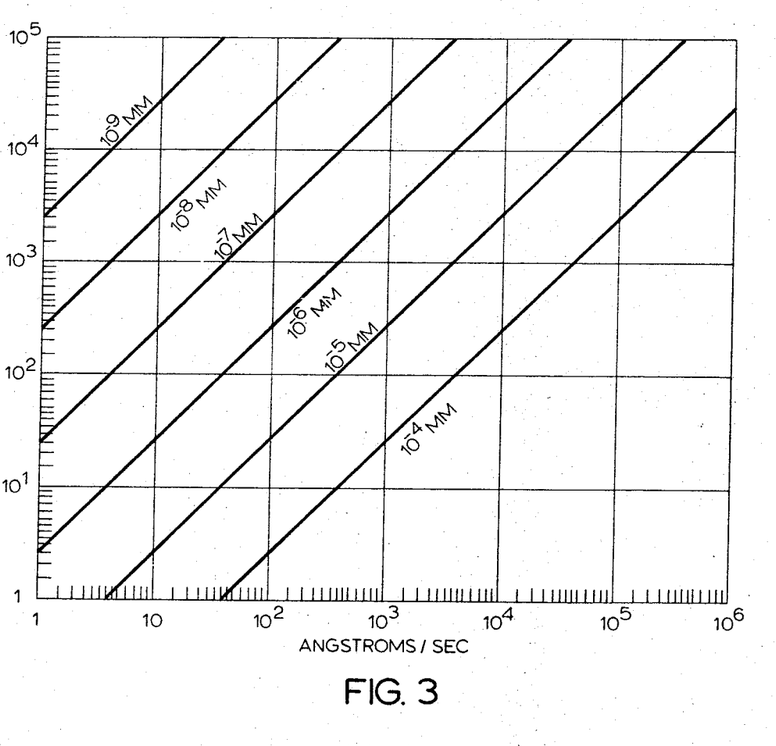
FIG. 3 graphically illustrates the material:gas ratio as a function of deposition rate, obtained by using the gun depicted in FIG 1.

Material:gas ratios versus deposition rate and ambient gas pressure are shown in FIG. 3. This method of evaporation yields material:gas ratios in excess of $10^5$:1 at ambient gas pressures of $15^6$ mm.

To select the gun design constants for the foregoing electron gun, the following expression for beam current is first used.

$$I = \frac{29.33 \times 10^{-6} V^{3/2} \sin^2(\theta/2)}{A^2}$$

where:

$\theta$ is the half gun aperture
V is the gun volts
A is a constant determined by the ratio of cathode anode radii, $R_C/R_A$.

For $R_C/R_A = 2.0$, $A^2 = .75$. (See J. R. Pierce, "Theory and Design of Electron Beams," D. Van Nostrand, 1954, page 177.)

Using the above, we find that for a beam current of 6 amps that $\theta = 16°$.

Now assuming a cathode emitter button 1.6 cm. diameter then:

$$R_C = .8/\sin\theta = 2.9 \text{ cm.}$$

$$R_A = 1.45 \text{ cm.}$$

Figure 4:
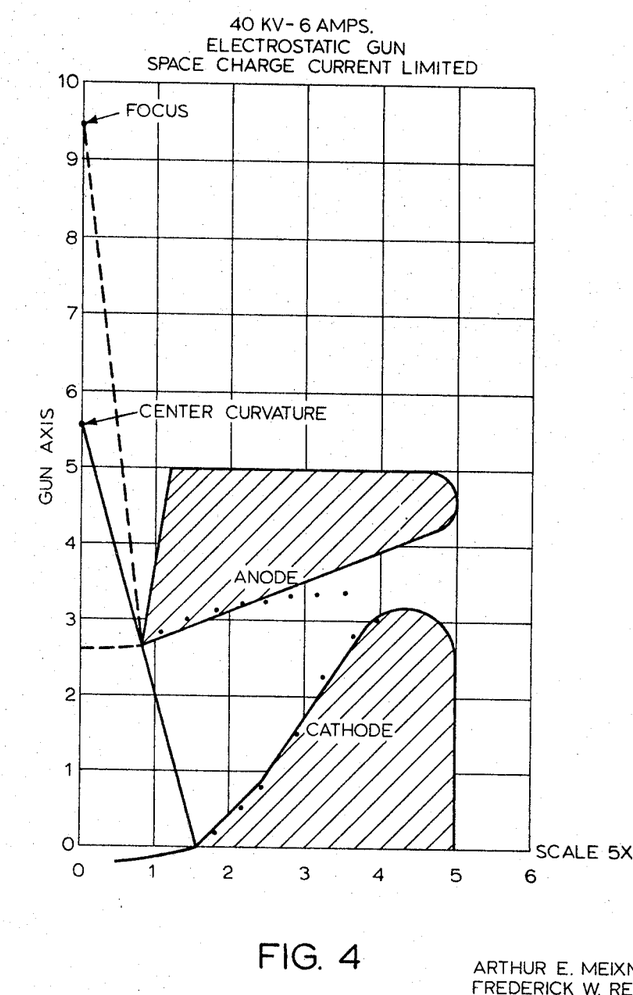
FIG. 4 illustrates the design of the shape of the anode and cathode for the gun depicted in FIG. 1.

While the above gun will operate, the beam collection efficiency of the emitted electrons would be poor. This is undesirable because of the high emission requirements imposed on the cathode as well as undue heating of the anode. Spagenberg in his book "Vacuum Tubes," pages 456–457, shows electrode shapes determined experimentally to overcome this problem. This information has been used to design the electrode shapes which are shown in FIG. 4. The curved shapes shown by dots have been approximated with straight lines to facilitate machining operations.

Since very large thermionic currents are required for ultra-fast evaporation, it is desirable to operate the cathode at as high a temperature as possible consistent with cathode life and tungsten evaporated. To this end it is essential that the cathode be heated only for the necessary time to produce the single high current pulse. The heating time for the following cathode has been calculated as indicated below.

Radius of cathode _____________________ mm__ 8
Thickness _____________________________ mm__ 2
Mass __________________________________ gms__ ≃8
Heat content, (T–300) joules _______________ 1.3
Total area ____________________________ sq. cm__ 4
Emissivity _______________________________ .33

Due to the method of mounting of the button in which small loops of 5 mil tungsten wire are employed to reduce loss by conduction, the conduction losses can be neglected. These are less than 10% of the radiation loss.

If 650 watts are used to heat the button:

$$650 - BT^4 = 1.3 \, dT/dt$$

$$T^4 - T_0^4 \simeq T^4$$

$$B = 5.6 \times 10^{-12} \times .33 \times 4 \times T = 7.5 \times 10^{-12}$$

$$dt = \frac{1.3}{B}\left(\frac{dT}{650/B - T^4}\right) = K\left(\frac{dT}{a^2 - T^2} + \frac{dT}{a^2 + T^2}\right)$$

where:

$$K = 1.3/2a^2 B = .935 \times 10^{-4}$$

or $$t = K\left[\frac{1}{a}\tan^{-1}\left(\frac{T}{a}\right) + \frac{1}{2a}\log_e\frac{a+T}{a-T}\right] - C$$

when:

$t = 0$
$T = 300$ or $C = .60$
$a^2 = 9.3 \times 10^6$
$a = 3.05 \times 10^3$

In a well-designed ultra-high vacuum system the ultimate pressure is governed by the outgassing rate of the wall of the system and the pumping speed provided. It is common practice to make the walls of such systems stainless steel with the inside surfaces highly polished. The high polish reduces the effective surface area for gas adsorption and trapping. The rate of gas evolution from such surfaces in a vacuum depends in part upon the previous history of the surface. Pumping alone is not very effective in reducing the evolution rate; in fact, even after 10 or more hours the rate may be $10^{-5}$ micron liters per square cm. per second. If the system has a surface area of $5 \times 10^3$ sq. cm., and a pumping speed of 500 liters/sec. is available, the vacuum attainable at this time would be only $10^{-7}$ mm. Consequently, it is accepted practice to bake-out such systems to 300–450° C. After such bake-out the evolution rate may be $10^{-8}$ micron liters per sq. cm. per sec. or less. If there are no leaks and we still have a pumping speed of 500 liters/sec. the vacuum should reach $10^{-10}$ mm.

Due to the large heat capacity of such systems, most of the time is consumed in heating and cooling. Cycle times of 16 hrs. are usual.

Now the major part of the above gas load is water vapor adsorbed on the wall surface. If the surface could be heated to these temperatures without materially raising the average wall temperature, the cycle time should be greatly reduced. Such heating can be accomplished by using energy pulses of large magnitude and very short duration, and, of course, a restricted number of pulses in a given length of time. The restrictions on the total number of pulses can, of course, be removed if the exterior of the walls is cooled.

Surface heating may be calculated using well-established principles of transient heat flow.

In this application we are interested in a one-dimensional flow across a wall thickness. The thickness is assumed semi-infinite, and conductivity (thermal) and specific heat values are assumed constant over the temperature range of interest.

Let:

$\theta$ = wall temperature at distance X
$\theta_s$ = surface temperature at $X=0$
F = incident heat flex—cal./sq. cm./sec.
K = thermal conductivity, c.g.s. units
k = diffusive tendency, $K/_{PC}$
P = density, c.g.s. units
C = specific heat, c.g.s. units.

Then:

$$\theta = \frac{F}{K}\int_X^\infty erfc\frac{X}{2\sqrt{kt}}dX \quad (A)$$

The solution to this equation is:

$$\theta = \frac{2F}{K}\left\{\left(\frac{kt}{\pi}\right)^{1/2} e^{\frac{-X^2}{4kt}} - \frac{X}{2} erfc\frac{X}{2\sqrt{kt}}\right\} \quad (B)$$

The surface temperature $\theta_s$ can be expressed as:

$$\theta_s = \frac{2F}{K}\left(\frac{kt}{\pi}\right)^{1/2} \quad (C)$$

For stainless steel:

$K \simeq k = .04$
$C = .125$
$P = 8$

Using these values, and converting calories to joules gives:

$$J \text{ joules/sq. cm.} \simeq .75\ \theta_s t^{1/2} \quad (D)$$

Equation D has been used to calculate three different values of surface temperature as a function of joules and time.

For the pulse times shorter than 1.0 millisecond the pulse energy required per sq. cm. to reach a surface temperature of 300° C. is less than 0.7 joule. For pulse times of .2 millisecond only 0.3 joule is required.

These pulse energies are within the capabilities of existing flash lamps such as are used for laser operation. (N. A. Kuebler and L. S. Nelson—"Radiant Energies and Irradiances of Capacitor Lamps"—Journal Optical Society of America—vol. 51, pp. 1411–16, 1961 and Carslaw and Jaeger—"Conduction of Heat in Solids"—Oxford Press.)

In the construction employed for this gun the target or evaporative material is located in essentially a field free space. If positive ions of any significant magnitude are generated during evaporation, there will be a tendency to reduce the space charge and hence make the focussed spot smaller. To overcome this difficulty, it may be necessary to provide for positive ion collection within the target holder. This can be done by introducing an electrode having a negative potential relative to the anode and target.

Heretofore, when rapid evaporation of materials was carried out, there was a spluttering of the substrate rendering the product useless. However, by means of the above-described gun, a controlled evaporation can be carried out on almost any material and the results obtained are repeatable.

EXAMPLE I

A prepared quartz microscope slide was used as a substrate. An evaporated thin film of gold of the order of 1000 A. thickness was then deposited on the quartz substrate to serve as one electrode plate of the capacitor. Standard techniques were employed in the deposition of the gold electrode plate such as described by L. Holland "Vacuum Deposition of Thin Film," John Wiley & Sons, New York, 1956, chapter VI.

A quartz film was evaporated by the pulsed electron gun previously described. Three pulses of approximately 40 milliseconds duration were employed at maximum values of beam voltage and current, respectively, of 12 kv. and 1.0 ampere. The substrate was outgassed in the vacuum prior to film deposition at a temperature of approximately 350° C. The vacuum was $10^{-6}$ mm. of Hg.

The calculated thickness of the deposited film, using the weight lost by the target and the known evaporation distance, was approximately 1700 A. By the use of approximately shaped masks the top and bottom evaporated gold electrodes formed 8 capacitors from this quartz film, each having an area of .0625 sq. cm.

Figure 6:
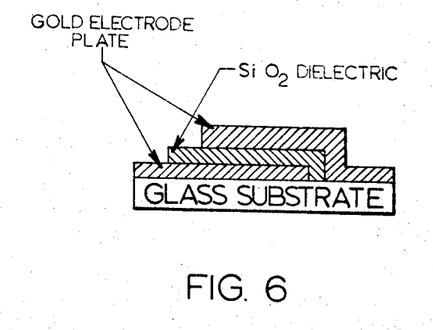
FIG. 6 illustrates the capacitor produced by the method described in Example I.

After evaporation of the dielectric film, the substrate was transferred to another vacuum station where it was reheated prior to evaporation of a second top gold film, also of the order of 1000 A. thickness. The finished capacitor was stored in a desiccator for several days, at which time measurements were made both in the desiccator and exposed to room air. The capacitor is shown in FIG. 6.

The capacity measured in the desiccator of each small square (.0625 sq. cm. area) agreed with that calculated for a film of this thickness and assumed dielectric constant of approximately 4. However, when the sample was exposed to room air it rapidly increased from $1.8 \times 10^{-9}$ to $55 \times 10^{-9}$ farads. This change was completely reversible upon returning the sample to the desiccator.

The measured change in capacitance as a result of humidity of the capacitors of Example I were then tabulated in Table I.

TABLE I

| Frequency (f) | Series capacitance, $C_s$, nano farads | Dissipation factor D | Series reactance, $X_s$ | Parallel impedance, $Z_p$ | Parallel capacitance, $C_p$, nano farads |
|---|---|---|---|---|---|
| In room air: | | | | | |
| 100 | 86 | .15 | 18,500 | 18,660 | 84 |
| 500 | 75 | .34 | 4,240 | 4,560 | 67 |
| 1,000 | 65 | .46 | 2,450 | 2,700 | 54 |
| 5,000 | 38 | .85 | 840 | 1,104 | 22 |
| 10,000 | 25 | .83 | 637 | 827 | 15 |
| 20,000 | 15 | .78 | 540 | 686 | 9.3 |
| In desiccator: | | | | | |
| 100 | 2.6 | .27 | 610,000 | 632,000 | 2.4 |
| 500 | 2.3 | .12 | 138,000 | 139,000 | 2.3 |
| 1,000 | 2.2 | .10 | 72,500 | 72,800 | 2.2 |
| 5,000 | 2.1 | .09 | 15,200 | 15,200 | 2.1 |
| 10,000 | 2.1 | .14 | 7,570 | 7,640 | 2.06 |
| 20,000 | 2.05 | .26 | 3,870 | 4,000 | 1.92 |

Figure 5:
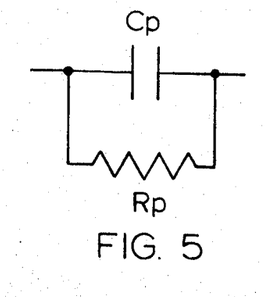
FIG. 5 explains schematically the equivalent circuit of the bridge used in some of the measurements described in Example I.

The equivalent circuit is shown in FIG. 5 and, from FIG. 5, $$R_p = X_p/D$$

$$C_p = \frac{C_s}{1+D^2}$$

$$Z_p = X_s(1+D^2)^{1/2}$$

The very large response of this quartz film capacitor to changes in moisture content of the surrounding ambient indicate its usefulness for indicating and measuring changes in humidity, etc. Its very fast response and essentially complete reversibility are important properties for such use.

Various other methods may also be used to read out the changes in dielectric properties with moisture, such as the control of an oscillator frequency or simply as a variable impedance.

Figure 7:
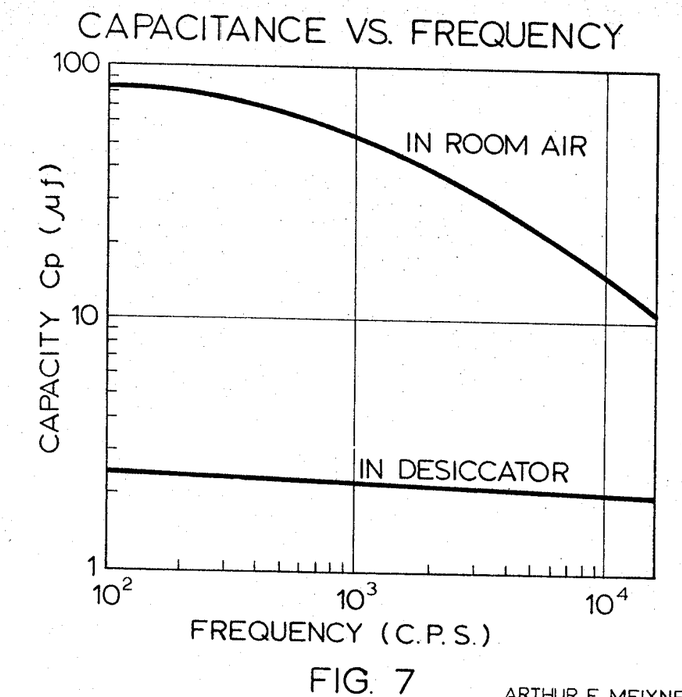
FIG. 7 shows a plot of capacitance as a function of frequency for a capacitor made in accordance with the present inventive concept.
Figure 8:
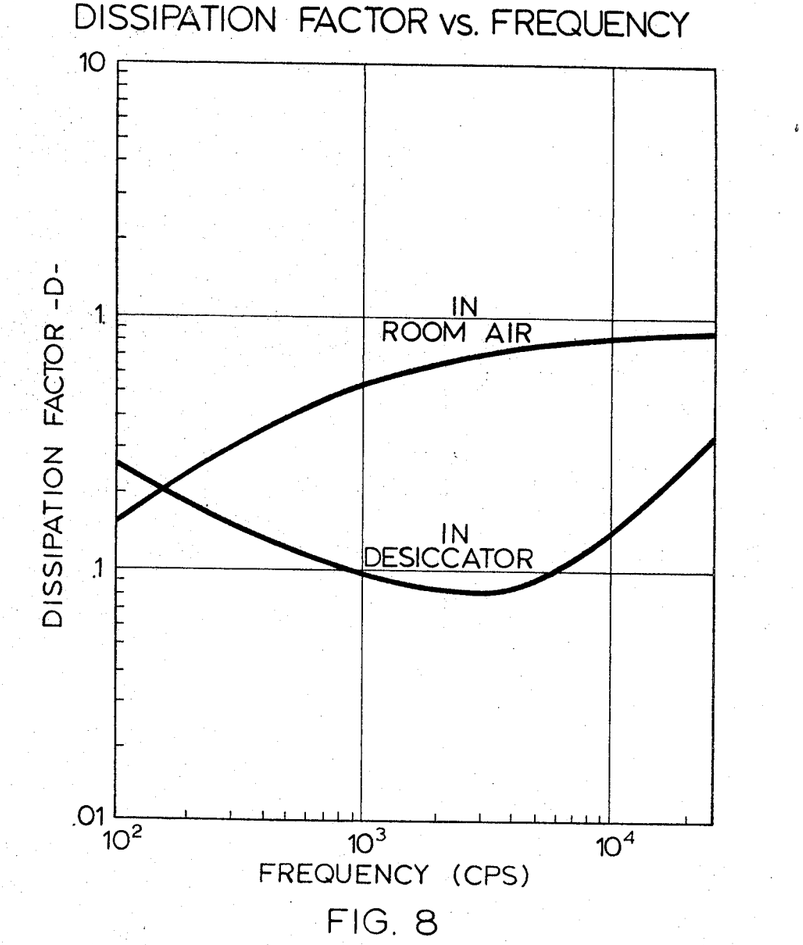
FIG. 8 shows a plot of the dissipation factor as a function of frequency for a capacitor made in accordance with the present inventive concept.
Figure 9:
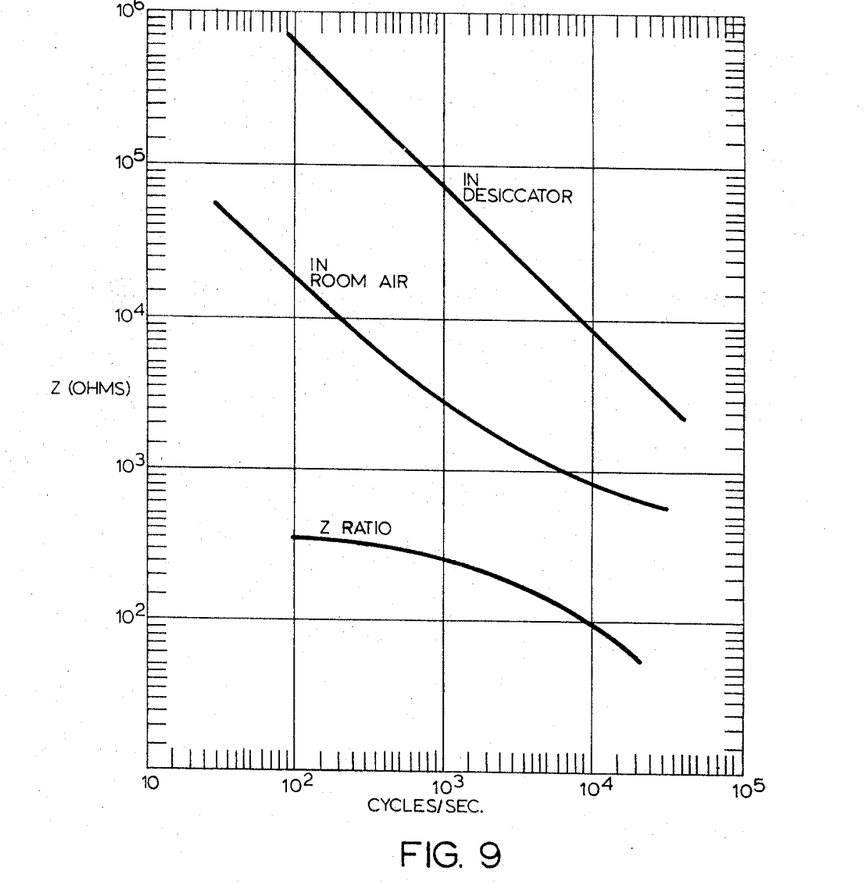
FIG. 9 shows a plot of the impedance as a function of frequency for a capacitor made in accordance with the present inventive concept.
Figure 10A:
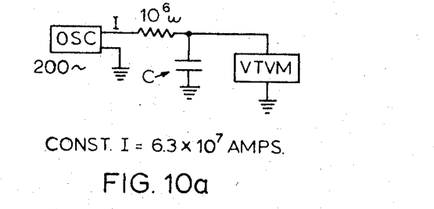
Figure 10B:
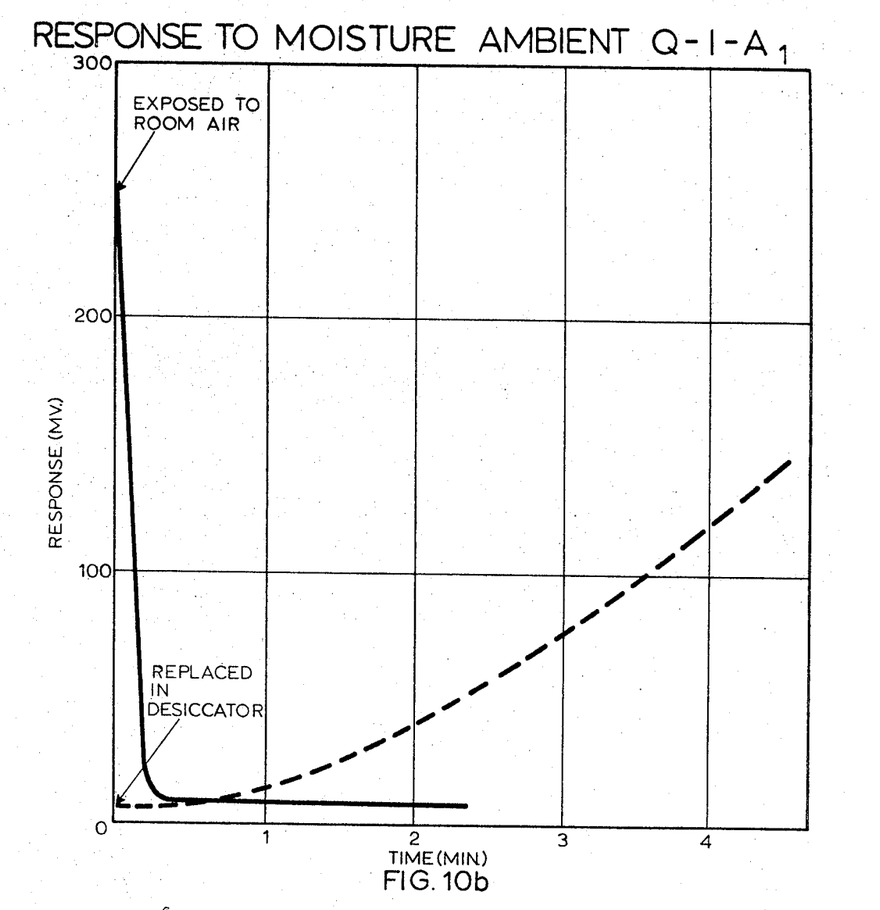

Capacitance, impedance and dissipation factors, as a function of frequency, were measured on a bridge whose equivalent circuit is shown in FIG. 5 as the capacitor $C_p$ produced in accordance with the present inventive concept in parallel with a resistor $R_p$, and plotted on FIGS. 7, 8 and 9, while the response time performance at a constant frequency of 200 c.p.s. was determined by calculating the change in impedance from bridge measurements taken at different time intervals. The bridge equivalent circuit for this measurement is shown in FIG. 10a and includes a 200 c.p.s. oscillator in series with a one million ohm resistor. The capacitor produced in accordance with the present inventive concept described herein is parallel with a vacuum tube voltmeter. The plotted results are shown in FIG. 10b.

EXAMPLE II

Measurement of adsorbed water vapor—thermocouple

Since heat energy is involved in adsorption and absorption, it is possible to determine the amount of gas adsorbed by the film. Since the rate of change is very rapid, it is possible to make measurements with good accuracy by noting the change in temperature of the substrate and film. The essential requirements are that the heat capacity of the substrate be as small as possible and that the change in ambient be rapid.

Mica was used as the substrate since it could be split into a thin sheet one mil thick. The temperature change was measured with an evaporated thin film thermocouple of aluminum and permalloy. The latter was found to give a sensitivity of 30 $\mu v./° C$. The quartz film was evaporated on top of the thermocouple and also over another separate aluminum film to provide a test capacitor for checking the performance of the quartz film as a dielectric.

The capacity measurements on the complete unit at different ambient conditions of condensable gas showed that the film was similar in properties to others previously made.

The completed unit was then placed in a small vacuum desiccator and evacuated. During pump-down, the thermocouple indicated that gas was being evolved from the film, and it became colder. After steady state had been reached and the temperature of the substrate returned to that of the surroundings, air was suddenly let into the system. The thermocouple indicated a rise in temperature of 6° C. Using the mass of the substrate, its specific heat and the temperature rise, it was calculated that 7.4 $\mu g$. of water was absorbed per sq. cm. of film. (The relative humidity of the room air was approximately 50%.)

EXAMPLE III

A large number of films of quartz, aluminum oxide and cerium oxide have also been evaporated on a variety of substrates. All of these show absorption effects similar in nature, but to a much lesser degree. Substrates used successfully were of rods of glass, polished fused quartz, mica, single crystal NaCl, fused alumina with an alkali free glass glaze from Corning Glass Co.

A number of condensable gases other than water vapor were also used and similar absorption behavior noted. In general the change in capacity increases with the dielectric constant of the vapor used. The magnitude of the effect is a fraction of the partial pressure of the ambient gas, the larger the pressure, the greater the pressure.

At room temperature the change in capacity becomes larger in going from carbon tetrachloride to water.

|  | K | Effect |
|---|---|---|
| Carbon tetrachloride | 2.2 | Small. |
| Trichlorethylene | 3.4 |  |
| Methylene chloride | 9.1 | Large. |
| Methyl alcohol | 33 |  |
| Water | 79 | Very large. |

K=dielectric constant liquid.

The dissipation factor of the dielectric changes markedly with the amount of vapor adsorbed. In the case of water vapor and quartz films the dissipation at 1 kc. increase with amount adsorbed passing through a maximum of about unity and then rapidly decreases as saturation is reached. Fully saturated being less than 0.1.

The capacity change responds rapidly to changes in ambient pressure. A rubber bulb attached to a closed volume containing the sample provides adequate short pulses of pressure change to be readily observed and measured.

It is to be observed, therefore, that the present invention provides for a method of manufacturing a thin film capacitor comprising the steps of depositing a first thin film electrode plate on a non-conducting substrate, then, depositing under vacuum, a thin film dielectric material of homogeneous silicon dioxide and suboxides, over one portion of the electrode plate by discharging electron pulses of the order of 250 kw. on quartz material so as to evaporate the quartz into silicon dioxide and suboxides thereof onto the electrode plate-containing substrate, and, depositing a second electrode plate in face-to-face relation with said first electrode plate over said dielectric material and said one portion of said first electrode plate.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:
1. A method of manufacturing an extremely humidity-sensitive, thin film capacitor, comprising the steps of:
   (a) outgassing a non-conductive substrate in a vacuum at a temperature of about 350° C.
   (b) depositing a first thin film gold electrode plate of the order of about 1000 A. on said substrate;
   (c) depositing under vacuum, a thin film dielectric material of homogeneous silicon dioxide and suboxides over one portion of the electrode plate by discharging electron pulses of the order of 250 kw. on quartz material so as to evaporate the quartz into silicon dioxide and suboxides thereof onto the electrode plate-containing substrate; and,
   (d) depositing a second gold electrode plate likewise of the order of about 1000 A., in face-to-face relation with said first electrode plate over said dielectric material and one portion of said first electrode plate.

2. A method as claimed in claim 1, including the step of reheating the dielectric-containing substrate prior to the evaporation of the second electrode plate thereon.

References Cited

UNITED STATES PATENTS

| 3,095,527 | 6/1963 | Barnes et al. | 117—217 X |
| 3,113,253 | 12/1963 | Ishikawa et al. | 117—217 X |
| 3,274,025 | 9/1966 | Ostis | 117—217 |
| 3,298,864 | 1/1967 | Maylandt | 117—217 X |

FOREIGN PATENTS

| 882,174 | 6/1953 | Germany. |

OTHER REFERENCES

Yarwood et al.: "Vakuum Technik," 11 Jahrgang, Heft 5, pages 149 and 150.

WILLIAM L. JARVIS, *Primary Examiner.*

U.S. Cl. X.R.

29—25.42; 117—213, 9.31, 106, 107